H. A. KUHN.
MINING MACHINE.
APPLICATION FILED MAY 18, 1914.
1,190,300.
Patented July 11, 1916.
2 SHEETS—SHEET 1.
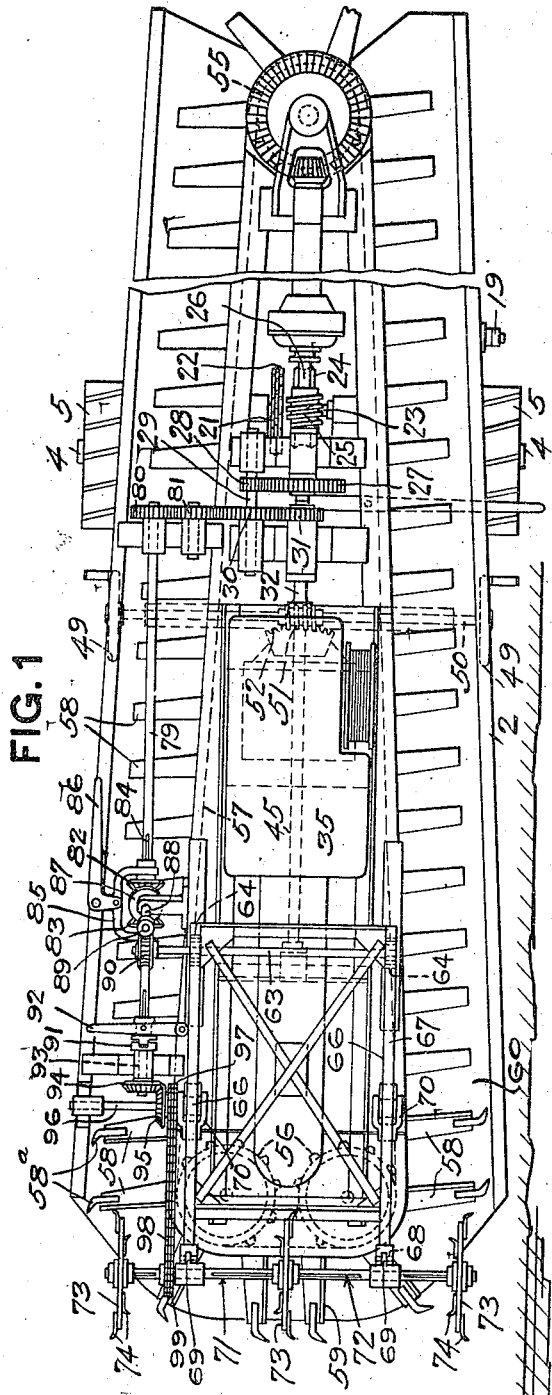
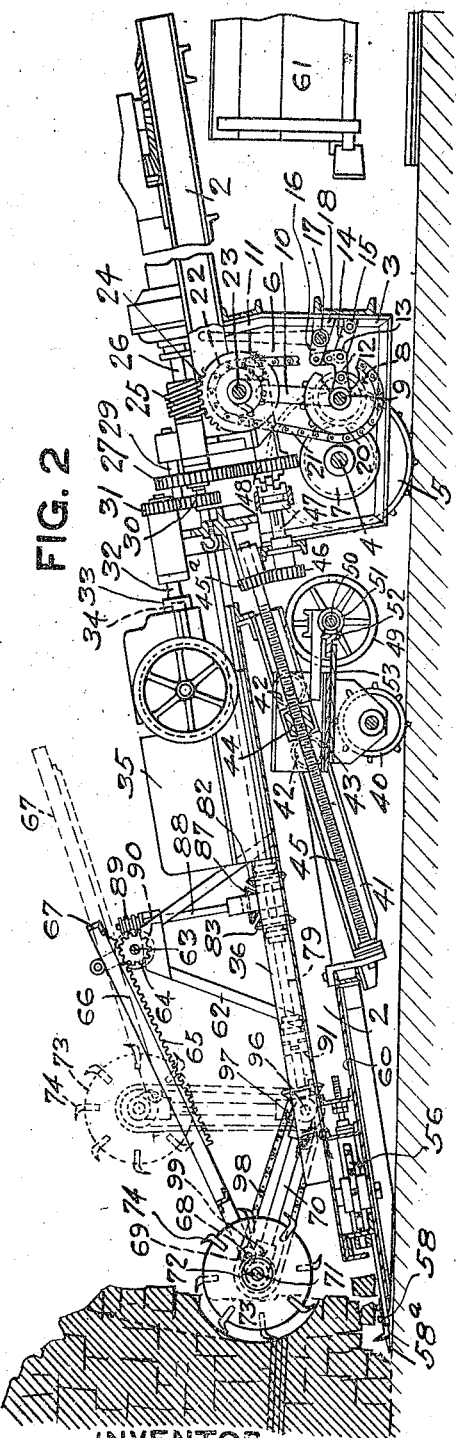
WITNESSES.
J. R. Keller
John F. Will
INVENTOR.
Harry A. Kuhn
By Kay Totten & Powell
attys

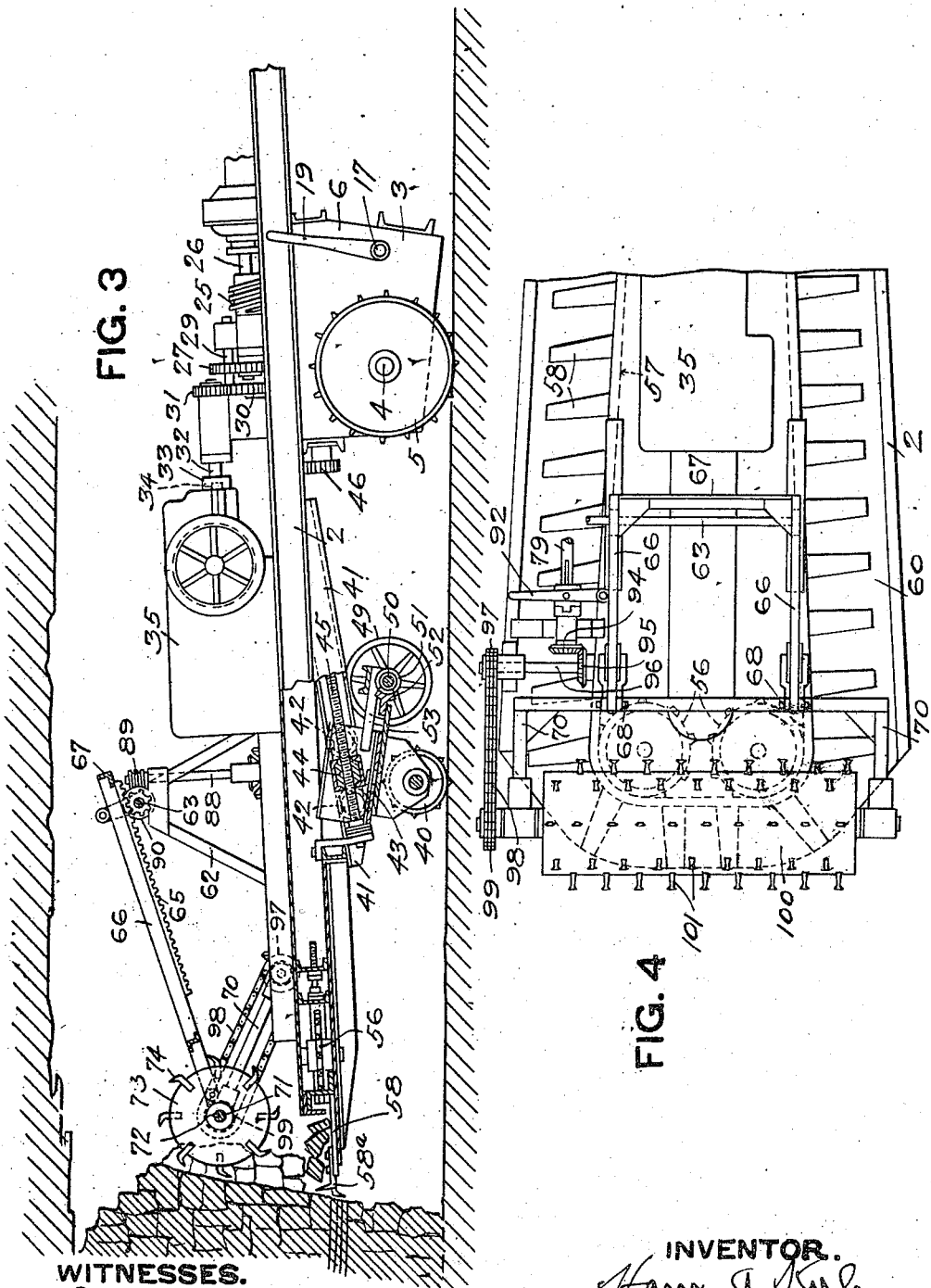

UNITED STATES PATENT OFFICE.

HARRY A. KUHN, OF PITTSBURGH, PENNSYLVANIA.

MINING-MACHINE.

1,190,300.     Specification of Letters Patent.     Patented July 11, 1916.

Application filed May 18, 1914. Serial No. 839,328.

*To all whom it may concern:*

Be it known that I, HARRY A. KUHN, a citizen of the United States, and resident of Pittsburgh, in the county of Allegheny and State of Pennsylvania, have invented a new and useful Improvement in Mining-Machines; and I do hereby declare the following to be a full, clear, and exact description thereof.

My invention relates to machines for mining coal.

The present invention applies especially to the mining of coal, where there has been an undercut made in the solid body of coal and the coal has been expanded along its lines of cleavage by shooting, the main object of the machine being to remove this coal in lump form, and breaking up or destroying the bands of slate which may occur in such coal and which will act to bridge the coal and prevent its being dislodged by undermining, in accordance with a method of mining coal set forth and claimed by me in an application filed October 21, 1913, Serial No. 796,497.

In the accompanying drawings, Figure 1 is a plan view of my improved machine; Fig. 2 is a side elevation; Fig. 3 is a like view partly in section showing the machine in its raised position. Fig. 4 is a plan view of a modification.

The numeral 2 designates a suitable frame which may be composed of beams, angle-bars, etc., united to form a rigid construction. This frame is supported normally in an inclined position, its rear end being carried by the truck 3, which is provided with the axle 4 on which the traction wheels 5 are mounted. The wheels 5 and the mechanism for driving same are housed in the box or casing 6. Within the casing 6 on the axle 4 is the friction sheave 7 which is engaged by the friction sheave 8 on the shaft 9. This shaft 9 is suspended from the bars 10 which are pivoted to the bracket 11. The toggle member 12 is connected to the shaft 9 and said toggle is pivoted at 13 to the link 14 which is pivoted to the lug 15 on the casing 6. The other end of the toggle is connected to the crank arm 16 on the stud shaft 17 which is mounted on the bracket 18. To the outer end of the stud shaft 17 is connected the operating lever 19. It is apparent that by operating the lever 19, the toggle member 12 is operated to move the friction member 8 into or out of contact with the friction sheave 7 to transmit power to the driving axles.

Mounted on the shaft 9 is a sprocket wheel 20, the chain 21 passing around the sprocket wheel 20 and around the sprocket wheel 22 of the shaft 23 mounted in the frame. Mounted on the shaft 23 is the worm wheel 24 which is connected with the worm 25 on the shaft 26. This shaft 26 has the gear wheel 27 which is engaged by the driving pinion 31 on the shaft 32. The shaft 32 has the clutch bars 33 adapted to receive the square end of the shaft 34 of the motor 35. This motor, which in the present case is an electric motor, is the driving power for the undercutting mechanism 36, which may be of the ordinary construction, comprising a cutter chain which is driven by power transmitted from the motor 35. When this undercutting mechanism is mounted on the frame 2, the motor shaft 34 engages the clutch box 33, and power is transmitted from the motor to the mechanism for connecting the traction wheels 5 to the other parts of the mechanism to be hereinafter described.

In front of the truck 3 are the steering wheels 40 which support the forward end of the frame 2. Channels 41 are secured to the frame 2, said channels being inclined and the flanges of said channels forming a track for the rollers 42 of the buggy 43. The buggy 43 has the threaded nut 44 with which the threaded bar 45 engages. The upper end of the threaded bar has the pinion 45ª which meshes with the pinion 46 on the shaft 47. This shaft 47 has the gear wheel 48 which meshes with the gear wheel 27. By the rotation of the threaded bar 45 the buggy is advanced with its rollers 42 moving in the channel bars 41, and in this way the front end of the frame 2 is lifted, as indicated in Fig. 3.

To operate the steering wheels 40, hand wheels 49 are provided mounted on the shaft 50, said shaft carrying the worm 51 which engages the toothed sector 52 on the swivel plate 53 of the truck 43. In this manner, the steering wheels are properly directed to move the machine in the direction desired.

At the rear end of the frame 2 is the sprocket wheel 55 and at the forward end of said frame are the sprocket wheels 56. The chain 57 passes around said sprocket wheels and said chain carries the flights 58 at intervals. The outer ends of the flights 58 are formed with integral cutters or diggers 58ª, or if desired, said cutters or diggers may be made detachable and are adapted to cut or dig under the body of coal which has been lowered by shooting, as fully hereinafter set forth. The cutters on the flights are preferably arranged alternately extending upwardly and downwardly so as to make a wider cut. The front edges of the flights are preferably beveled to an edge as indicated at 59 to enable them to pass readily through the mass of coal.

The pan 60 is secured to the frame 2 below the flights and said flights are adapted to travel along the said pan and convey the coal which is dislodged onto the pan by the action of the diggers or cutters. The coal is discharged at the rear into the pit wagon 61.

Extending up from the frame 2 are the pedestals 62 which form the support for the shaft 63 which is journaled therein. This shaft 63 has the pinions 64 which mesh with the teeth 65 on the side bars 66 of the frame 67. The forward end of the frame 67 has its side bars connected by pins 68 to the lugs 69 on the tilting frame 70. The tilting frame 70 has the shaft 71 with the key or feather 72 extending longitudinally thereof. Mounted on the shaft 71 are the disks 73 provided with the cutters 74, said disks being adapted to be moved along the shaft 72 and having grooves in their hubs engaging the key 72 on said shaft 71.

A shaft 79 is mounted in suitable bearings in the frame 2, said shaft at its inner end having the gear wheel 80, which meshes with the pinion 81 connected up with the motor 35. Beveled pinions 82 and 83 are connected at the forward end of the shaft 79 and slidable on the keys 84 on said shaft. A yoke 85 is connected up to the beveled pinions 82 and 83, and said yoke is operated by the lever 86 for throwing said beveled pinions into and out of engagement with the reversing pinion 87. The pinion 87 is mounted on the vertical shaft 88 and at the upper end of said shaft is the worm 89, which meshes with the worm wheel 90 on the shaft 63. In this manner power is applied to move the frame 67 and tilt the tilting frame 70 at different angles as may be desired.

In order to drive the shaft 71 and the disks 73 carried thereby the shaft 79 is provided with clutch mechanism 91 operated by the lever 92. The shaft 93 which is connected up to the shafts 79 by the clutch mechanism has the beveled pinion 94 which meshes with the beveled pinion 95 on the shaft 96. A sprocket wheel 97 on the shaft 96 is connected by the chain 98 with the sprocket wheel 99 on the shaft 71.

In the operation of my improved machine, the undercutting mechanism 36 is dragged off the frame 2 and brought into position in the ordinary manner, as set forth in said application Serial No. 796,497, and the undercut made in the solid wall of the coal whereupon said undercutting mechanism is drawn back onto the frame 2, the tilting frame having been thrown up into the position indicated in Fig. 2 to permit of the said undercutting mechanism clearing the cutting disks 73. The undercut having been made and the coal expanded along its lines of cleavage by shooting, as set forth in said application, and the expanded coal having settled into the undercut, the machine is then advanced so as to bring the cutters and flights in operation to form a second undercut under the mass of expanded coal, and along the same line as the original undercut. The machine in this operation is inclined as indicated in Fig. 2, and when the cutters and flights have been advanced a proper distance under the coal, the cutting disks 73 are then brought into play and in order to bring said cutting disks into proper position, the beveled pinion 87 is thrown into engagement with either pinion 82 or 83 whereupon the shaft 63 is rotated and the pinions 64 engage the teeth 65 of the frame 67, lower the disks 73 into position to cut into the wall of expanded coal and make vertical cuts therein. After the cutting disks have been brought into this position, the feed screw 45 is rotated and the buggy 43 is advanced thereby raising the forward end of the frame 2 as clearly set forth and described in an application of even date herewith, Serial No. 839,327. As the frame continues to rise, the cutting disks move upwardly cutting a vertical groove in the coal and breaking up any bands which may be in the coal, at the same time coöperating with the cutters and flights 58 to dislodge the coal; said coal will be released of its adhesions along the lines of cleavage, and any lumps formed will drop onto the conveyer to be carried back to the car. In this machine I have therefore not only the means for undercutting the expanded coal and applying an upward pressure, as in said application Serial No. 839,327, but in addition I have the advantage of the vertically arranged cutting disks which sever the coal along vertical lines acting to further disrupt or destroy the bridging effect of the bands and at the same time shearing the bed of expanded coal and removing it in large lumps.

If desired the frame 2 may be advanced without elevating and the disks 73 may be moved up or down to cut the mass of coal.

In case the cutting disks 72 should meet with such resistance in the way of slate formations as to endanger said cutting disks, the cutting disks may be moved along the shaft 71 to different positions, so as to enter the coal at different points. The withdrawal of the cutting disks can always be effected readily by the mechanism described and the disks thrown back into the position indicated in Fig. 2, where they are out of the way and will in no way interfere with the moving of the undercutting mechanism 36 onto or off the frame 2.

In Fig. 4 I have illustrated a modified form of my invention in which I employ a drum 100 with bits 101 therein instead of the disks 73. The drive is the same as in the first instance.

What I claim is:

1. In a mining machine, the combination with a suitable frame, of an endless chain, cutting mechanism carried thereby, means for advancing the same laterally into the wall of coal, conveying mechanism, means for moving said frame at an angle to the line of travel of the cutting mechanism and simultaneously therewith, and cutting mechanism carried by said frame working at an angle to the first named cutting mechanism.

2. In a mining machine, the combination with a suitable frame, of an endless chain, cutting mechanism carried thereby, means for advancing the same laterally into the wall of coal, conveying mechanism, means for raising said frame at an angle to the line of movement of the cutting mechanism, and simultaneously therewith, and a cutting disk carried by said frame operating at an angle to the line of cut of said first cutting mechanism.

3. In a mining-machine, the combination with a suitable frame, of an endless chain, cutting mechanism carried thereby, means for advancing the same laterally into a mass of coal, conveying mechanism, a swinging frame carried by said first named frame, and cutting mechanism carried by said swinging frame operating at an angle to the line of movement of said first named cutting mechanism.

4. In a mining machine, the combination with a suitable frame, of an endless chain, cutting mechanism carried thereby, means for advancing the same laterally into the mass of coal, conveying mechanism, a swinging frame on said first named frame, cutting mechanism on said frame moving at an angle to the line of movement of the first named cutting mechanism, and means for raising and lowering said swinging frame.

5. In a mining machine, the combination with a suitable frame, of cutting mechanism carried thereby, means for advancing same into the mass of coal, conveying mechanism, a swinging frame on said first named frame, cutting mechanism carried by said swinging frame, operating at an angle to the line of movement of said first named cutting mechanism, a rack connected to said swinging frame, and a pinion supported by said first named frame engaging said rack.

6. In a mining machine, the combination with a suitable frame, of an endless chain, cutting mechanism carried thereby, means for advancing same laterally into the mass of coal, conveying mechanism, a swinging frame carried by said first named frame, a series of cutting disks carried by said swinging frame, and means for raising and lowering said swinging frame.

7. In a mining machine, the combination of a frame normally supported at an incline, an endless chain, cutting mechanism carried by said chain, means for advancing same laterally into the mass of coal, conveying mechanism, means for raising the forward end of said frame, and cutting mechanism carried by said frame operating at an angle to the line of movement of said first named cutting mechanism.

8. In a mining machine, the combination of a frame normally inclined downwardly at its forward end; an endless chain; cutting mechanism carried thereby; means for advancing same laterally into the mass of coal; conveying mechanism; means for raising the forward end of said frame; cutting mechanism carried by said frame, operating at an angle to the line of cut of said first-named cutting mechanism; and means for simultaneously operating said cutting mechanisms and elevating the forward end of said frame.

9. In a mining machine, the combination with a suitable frame, of an endless chain, cutting mechanism carried thereby, means for advancing same laterally into the mass of coal, conveying mechanism, a swinging yoke frame carried by said first named frame, a shaft in said yoke frame, cutting mechanism carried by said shaft, means for driving said shaft, and means for raising and lowering said swinging yoke frame.

10. In a mining machine, the combination with a suitable frame, of cutting mechanism carried thereby, means for advancing the same into the mass of coal, conveying mechanism, a swinging frame on said first named frame, cutting mechanism carried by said frame, operating at an angle to the line of movement of said first named cutting mechanism, a rack connected to said swinging frame, a raised support on said first named frame, and a pinion carried by said raised support and engaging said rack.

In testimony whereof, I the said HARRY A. KUHN have hereunto set my hand.

HARRY A. KUHN.

Witnesses:
 JOHN F. WILL,
 ROBT. D. TOTTEN.